United States Patent [19]
Ford et al.

[11] Patent Number: 5,796,880
[45] Date of Patent: Aug. 18, 1998

[54] TECHNIQUE FOR MODULATING OPTICAL SIGNALS IN OPTICAL COMMUNICATIONS

[75] Inventors: Joseph Earl Ford, Oakhurst; James Albert Walker, Howell, both of N.J.

[73] Assignee: Lucent Technologies Inc., Murray Hill, N.J.

[21] Appl. No.: 751,833

[22] Filed: Nov. 18, 1996

[51] Int. Cl.$^6$ .................. G02F 1/01; G02B 5/08
[52] U.S. Cl. .......... 385/1; 385/2; 385/8; 385/15; 385/16; 385/147; 359/846
[58] Field of Search ................ 385/1, 2, 3, 4, 385/5, 8, 9, 12, 13, 15, 16, 147; 359/846, 847

[56] References Cited

U.S. PATENT DOCUMENTS

| | | | |
|---|---|---|---|
| 4,678,902 | 7/1987 | Perlin | 385/12 X |
| 4,744,625 | 5/1988 | Lanzisera | 385/1 |
| 5,253,099 | 10/1993 | Heidemann | 385/1 X |
| 5,256,869 | 10/1993 | Lin et al. | 250/201.9 |
| 5,450,231 | 9/1995 | Battig et al. | 359/290 |
| 5,613,022 | 3/1997 | Odhner et al. | 385/37 |
| 5,621,829 | 4/1997 | Ford | 385/22 |

OTHER PUBLICATIONS

I. Ladabaum et al., "Micromachined Ultrasonic Transducers: 11.4 MHz Transmission in Air and More," *Appl. Phys. Lett.*, vol. 68, No. 1, Jan. 1996, pp. 7–9.

D. Spoliansky et al., "Micromachined Ultrasonic Air–Transducers (MUTs)," *Microelectronic Engineering* 30 (1996), pp. 535–538.

*Primary Examiner*—Brian Healy

[57] ABSTRACT

In an optical transmitter, an input optical fiber delivers an optical signal to a fiber coupling modulator whose reflective surface is transformable in response to the data to be transmitted. In a first state of the modulator corresponding to a first data value, the reflective surface is flat and smooth. The optical signal, which may be a continuous-wave light, is reflected from the surface and efficiently coupled to an output fiber. In a second state of the modulator corresponding to a second data value, the reflective surface is controllably deformed to cause an aberration in reflecting the optical signal. As a result, a much reduced amount of light energy is coupled to the output fiber.

33 Claims, 5 Drawing Sheets

TECHNIQUE FOR MODULATING OPTICAL SIGNALS IN OPTICAL COMMUNICATIONS

FIELD OF THE INVENTION

The invention relates generally to optical communications and, more particularly, to optical communications using a fiber coupling modulator for modulating an optical signal.

BACKGROUND OF THE INVENTION

It is envisioned that in the near future most homes will be connected with optical fibers, in lieu of current copper wires, to provide much more bandwidth to meet the ever-demanding communications needs. To that end, network architectures for communications using optical fiber access have been proposed. One such proposed architecture is a wavelength-division-multiplexed (WDM) network architecture. A "loopback" WDM network pursuant to this architecture can be implemented using an optical modulator at each home. Such a WDM network desirably circumvents use of an otherwise expensive wavelength-stabilized source at the home. Specifically, the optical modulator is provided with an optical signal from a shared laser source at a central office. The optical signal comprises continuous-wave (CW) light or an "optical chalkboard" to be encoded by the modulator with information.

Free space surface normal optical modulators may be used in the WDM networks and are normally designed to vary the reflected (or transmitted) intensity of the optical signal from the central office. For example, a multiple quantum well (MQW) modulator varies the reflected intensity by absorbing a fraction of the CW light. One such MQW modulator is described in Cunningham et al., "Reflectivity from Multiple Quantum Well Modulators with Contrast Ratio of 22:1 at 1.55 μm," *Conference on Lasers and Electro-Optics 9*, 1996, OSA Tech. Digest Series, p. 487. However, all the prior art MQW modulators have not been sufficiently developed to operate at the requisite temperature and wavelength ranges.

Another optical modulator is a mechanical anti-reflection switch (MARS) modulator, which operates based on optical interference between the lightwave reflected from a dielectric membrane suspended above a substrate and that reflected from the substrate. For details on the design of MARS modulators, one may refer to U.S. Pat. No. 5,500,761 issued Mar. 19, 1996 to Goossen et al. Specifically, the reflectivity state of a MARS modulator can be changed from reflecting to non-reflecting by a change in the width of an air gap between the membrane and the substrate. The changing reflectively of the modulator modulates the optical signal from the central office. The change in the width of the air gap is accomplished by applying a voltage across the membrane and the substrate, resulting in an electrostatic force pushing the membrane toward the substrate.

The MARS modulator may be suitably used as a loopback modulator in a WDM network where the modulated output signal is reflected back into the fiber which provided the CW illumination. It is preferable, however, that the output signal be directed into a second fiber. Such an arrangement is referred to as a "dual-fiber" arrangement, and desirably reduces optical power loss and background noise. An optical package containing a dual-fiber arrangement and capable of illuminating a reflective modulator with light originating from an input fiber and delivering the reflected and modulated output into a second fiber is described in copending, commonly assigned U.S. patent application Ser. No. 08/712,530, entitled "Fourier-Plane Photonics Package".

However, the above MARS modulator is less desirable for use in the dual-fiber arrangement. In order to achieve effective communications in such an arrangement, the operating area of the modulator exposed to the optical signal is preferably large, compared to the collimated incident beam, which is typically 100 μm or larger in diameter. Nevertheless, a large operating area calls for a large membrane, which incurs a long response time in the modulator. Such a long response time is not conducive to high speed optical communications. In an attempt to reduce the response time, multiple MARS modulators can be placed close to one another to hopefully achieve a large effective operating area aggregately. However, because of the structural limitations of the MARS modulators, they cannot be disposed close enough to allow efficient and high contrast operation.

SUMMARY OF THE INVENTION

In accordance with the invention, an optical transmitter for communicating data employs a modulator having a reflective surface. In response to a first data value, the reflective surface reflects an optical signal provided by a first optical fiber onto the core of a second optical fiber, thereby coupling a substantial portion of the energy of the optical signal thereto. In response to a second data value, the reflective surface of the modulator is changed to cause an optical aberration in the reflected optical signal. Specifically, in the illustrative embodiment, the reflective surface is controllably transformed to have inversions or "dimples" thereon. The optical signal is deflected by the transformed surface off the core of the second fiber, thereby coupling a reduced portion of the optical signal energy thereto.

The relatively small invertible areas or "dimples" on the inventive modulator can be arranged close enough to one another to afford a relatively large effective operating area aggregately. In addition, the modulator can be easily scaled to provide the effective operating area in virtually any size. Advantageously, the modulator can be easily made oversized to facilitate its lateral alignment in the optical transmitter and, at the same time, enjoys a short response time attributable to the small size of the individual invertible areas.

BRIEF DESCRIPTION OF THE DRAWING

In the drawing.

Throughout this disclosure, unless otherwise stated, like elements, components and sections in the figures are denoted by the same numerals.

DETAILED DESCRIPTION

Figure 1:
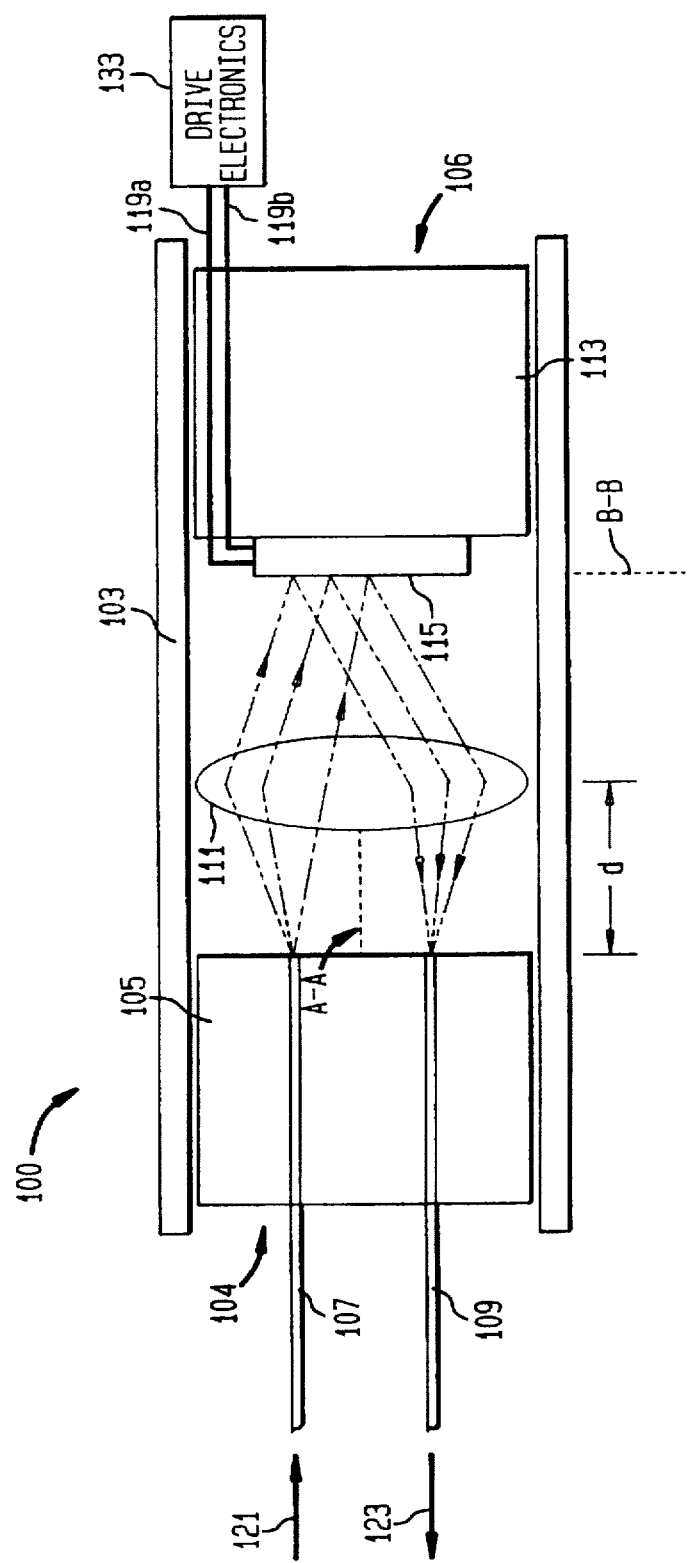
FIG. 1 illustrates a transmitter for optical communications in accordance with the invention.

FIG. 1 illustrates transmitter 100 incorporating fiber coupling modulator 115 for optical communications in accordance with the invention. In this illustrative embodiment, transmitter 100 includes a rigid, impact resistant sleeve 103 formed from a precisely shapeable material, such as ceramic. Sleeve 103 may assume any convenient shape, e.g., cylindrical, rectangular, and so forth. In an alternative embodiment, sleeve 103 may be configured similarly to the sleeves used for rotary slices, which typically include a beryllium copper sleeve shaped as a triangular prism with three glass rods in the creases as guide pins.

Sleeve 103 receives, at terminal 104, optical fiber 107 and optical fiber 109. Optical fiber 107 is used to deliver optical signal 121 from an active optical source, such as a laser or light emitting diode (LED), to transmitter 100 and more particularly to modulator 115. Such an optical signal comprises continuous-wave (CW) light or an "optical chalkboard" to be encoded by modulator 115 with information. Fiber 109 is used to transport modulated optical signal 123 transmitted from transmitter 100 and, more particularly, from modulator 115 to a receiver (not shown).

Figure 2:
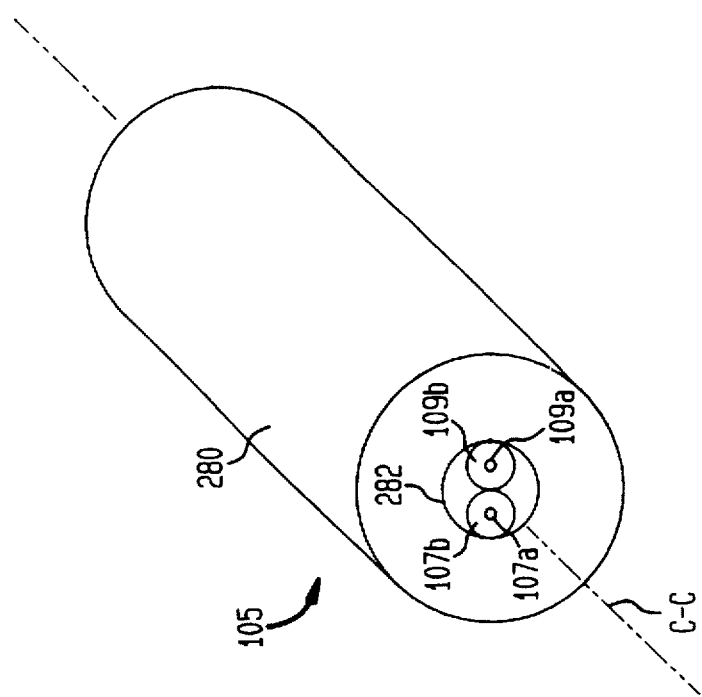
FIG. 2 illustrates a dual-fiber ferrule used in the transmitter of FIG. 1.

It will be appreciated that optical fibers 107 and 109 must be retained in a specific location with respect to other optical components within transmitter 100. Such positioning is achieved by dual-fiber ferrule 105. As shown in FIG. 2, ferrule 105 comprises bore 282 located along the longitudinal symmetry axis C—C of retaining member 280. The latter is made from a rigid, stable material capable of being precisely formed into a desired shape. Preferably, retaining member 280 is a ceramic or glass.

In this particular embodiment, optical fibers 107 and 109 received by bore 282 have their plastic coating layers removed. That is, fibers 107 and 109 as received respectively comprise only fiber cores 107a and 109a, and cladding layers 107b and 109b. In dual-fiber ferrule 105, bore 282 is shown to be round in cross section. The size of bore 282 is large enough to accept the bare fibers in a tight fit. It should be appreciated that because of the axial symmetry of the optics, there is no need for a particular rotational orientation of the dual-fiber ferrule 105.

Referring back to FIG. 1, sleeve 103 receives, at terminal 106, modulator 115 which is preferably disposed on mount 113. The latter may be an electrical header which provides electrical connection between modulator 115, and drive electronics 133 located outside sleeve 103. Electrical connection to drive electronics 133 is provided by electrical contacts 119a and 119b. In the case of an electrical header, contacts 119a and 119b are typically pins.

The structure of modulator 115 is fully described hereinbelow. It suffices to know for now that, in accordance with the invention, modulator 115 in a first state has a smooth surface which reflects optical signal 121 from fiber core 107a into fiber core 109a. In a second state, the surface of modulator 115 is controllably transformed to cause an aberration in the reflected optical wavefront so that the reflected optical signal is blurred and not focused onto receiving fiber 109. As a result, the reflected light is scattered into fiber cladding 109b, with much reduced light energy entering fiber core 109a. The first and second states are switched in response to the data to be transmitted, and correspond to a first binary bit value and a second binary bit value, respectively.

To that end, disposed within sleeve 103 between optical fibers 107 and 109 on one side and modulator 115 on the other side is fiber collimation lens 111 for imaging optical fiber 107 into fiber 109. Suitable lenses for lens 111 include, without limitation, gradient index (GRIN) lenses, ball lenses and molded lenses, such as, for example, injection molded lenses. Lens 111 is positioned at a distance, d, from optical fibers 107 and 109 such that the optical beam emerging from lens 111 is substantially collimated.

Fiber cores 107a and 109a are equidistant from the optical axis A—A of lens 111. Modulator 115 is located at the Fourier plane B—B. It is well-known the Fourier plane is essentially the back focal plane of a lens. That is, a collimated beam entering the lens would be focused to a point on a surface located at the Fourier plane. It is particularly advantageous to place a reflective photonics device such as modulator 115 in the Fourier plane; doing so creates a telecentric optical system upon two passes through the lens. A telecentric system is defined as one in which the entrance pupil and/or the exit pupil is located at infinity. In the context of a fiber optic system, telecentricity means that the optical beam incident on the output fiber matches the optimum incidence angle, resulting in optimized coupling. Thus, the reflected optical signal 123 is imaged, via lens 111, into optical fiber 109 with high efficiency during the first state of modulator 115, as shown in FIG. 1.

Figure 3:
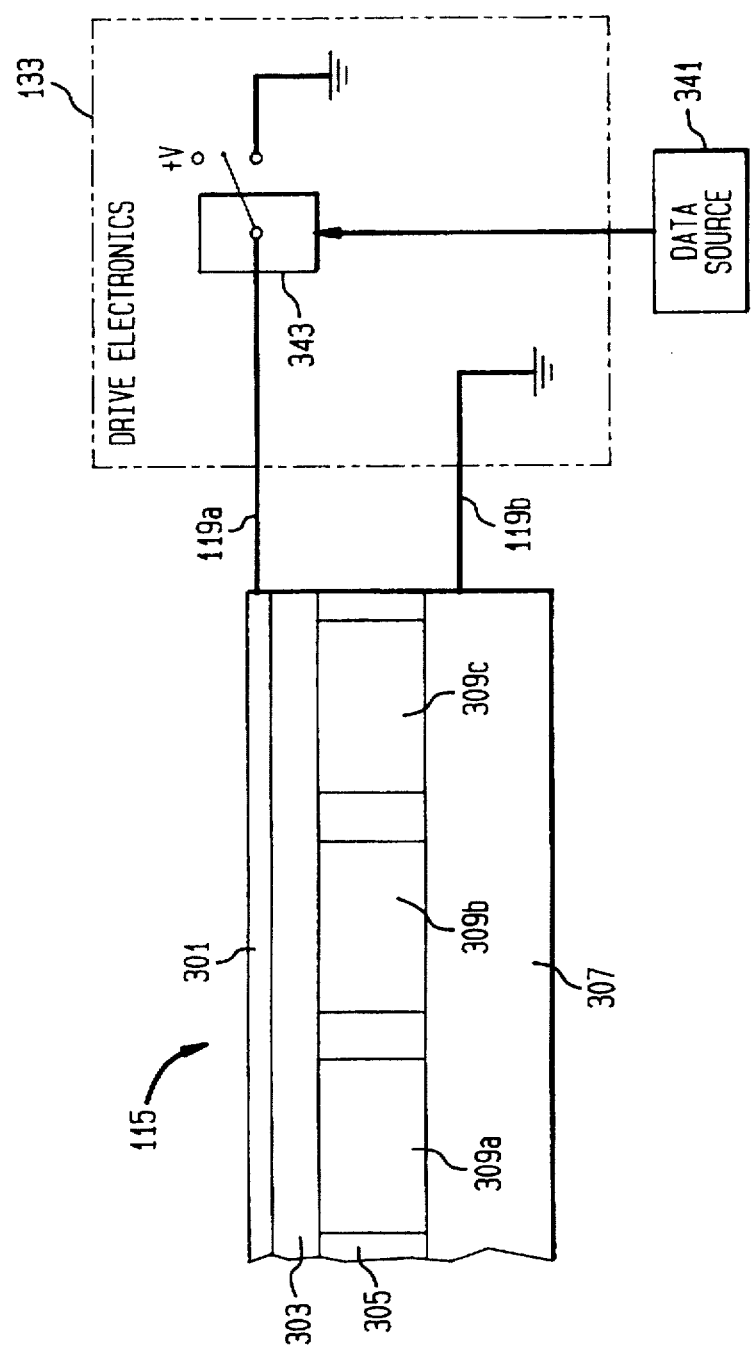
FIG. 3 illustrates a cross section of a fragment of a modulator, and drive electronics in cooperation therewith in the transmitter of FIG. 1.

The structure of modulator 115, along with drive electronics 133, will now be described. FIG. 3 shows a fragmentary cross section of modulator 115 which is connected to drive electronics 133 through electrical contacts 119a and 119b. As shown in FIG. 3, modulator 115 includes four layers, namely, metallic layer 301, silicon nitride ($SiN_x$) layer 303, phosphosilicate glass (PSG) layer 305, and conductive silicon substrate 307. It should be pointed out that layer 305 is in a honeycomb structure and includes air gaps 309a, 309b and 309c between layer 303 and substrate 307.

Modulator 115 is fabricated by depositing a 1-3 Am thick PSG layer (305) on a highly doped, n-type silicon wafer (307) using a low pressure chemical vapor deposition (LPCVD) process. A 0.2 μm layer of LPCVD silicon nitride is then deposited on the PSG layer to form layer 303. A 500–1000 Å film of gold is evaporated onto layer 303 to form layer 301. A pattern of etchant holes is then transferred to layer 301. The exposed gold and the nitride are then etched, leaving access to the PSG. Hydrofluoric acid (HF) is then introduced through the access holes (shown in FIGS. 4 and 5B) to attack the sacrificial PSG layer. As the PSG is etched away, air gaps between layer 303 and substrate 307 form.

Figure 4:
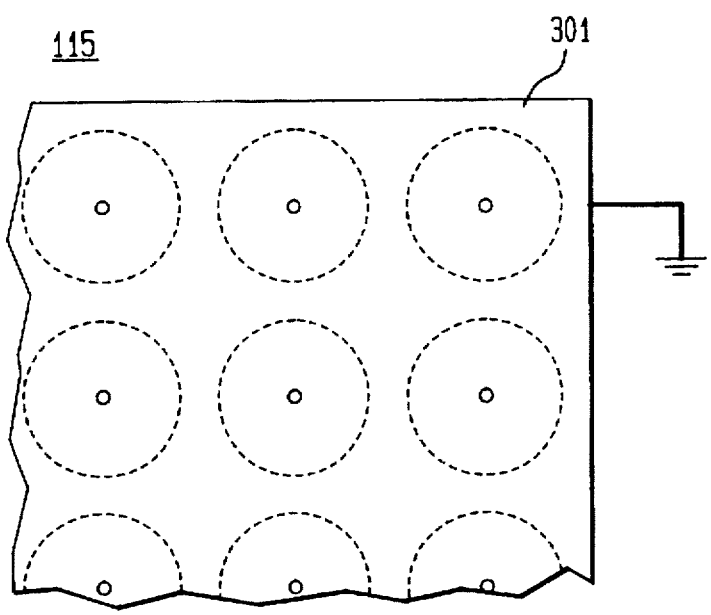
FIG. 4 is a top view of the fragment of the modulator in a first state.

With the above arrangement for modulator 115, when zero voltage is applied between gold layer 301 and substrate 307 in modulator 115, layer 303, together with metallic layer 301, remains flat and smooth. This being so, modulator 115 having layer 301 facing optical signal 121 functions similarly to a plane mirror with respect to the optical signal. In this preferred embodiment, gold is selected for metallic layer 301 because it affords a high reflectivity for reflecting optical signal 121, and conductivity for electrically connecting layer 303 to drive electronics 133. Optical signal 121 in this instance may take any wavelength between those of visible light and near infra-red. FIG. 4 provides a top view of a fragment of modulator 115 and shows a flat and smooth surface of layer 301 when zero voltage is applied across layer 301 and substrate 307. The dash circles mark the locations of the air gaps between layer 303 and substrate 307. The smaller solid-line circles are the access holes mentioned before.

Figure 5A:
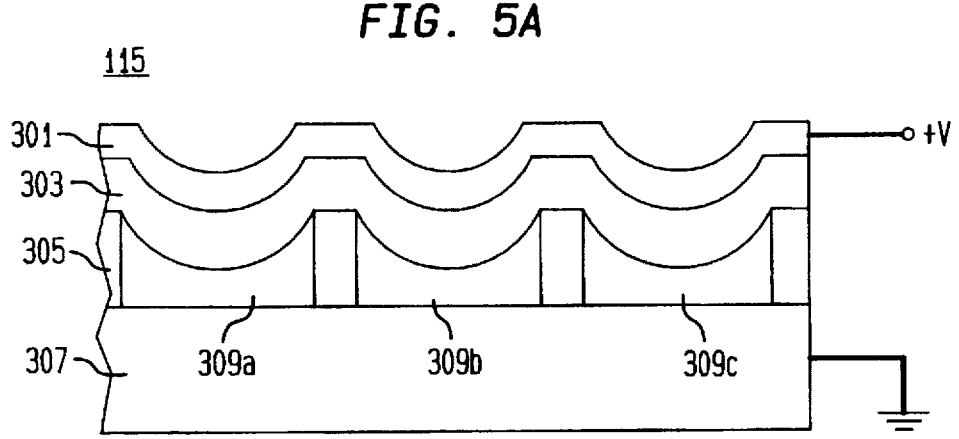
FIG. 5A is a cross section of the fragment of the modulator in a second state.
Figure 5B:
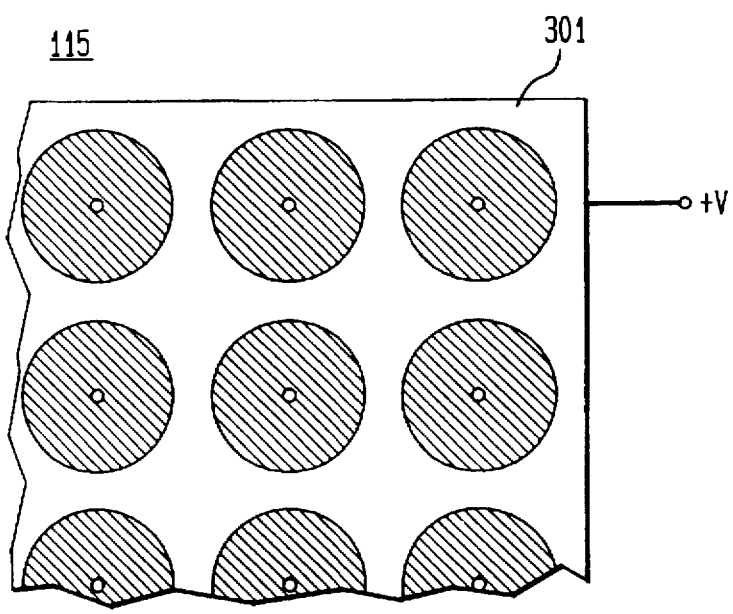
FIG. 5B is a top view of the fragment of the modulator in the second state.

Referring to FIG. 5A, when a predetermined voltage, +V, is applied across gold layer 301 and substrate 307, layer 303, together with layer 301, inverts into the air gaps thereunder, subject to induced electrostatic forces directed toward substrate 307. The extent of the inversion is a function of the radius of the air gap, the value of the applied voltage, and the elasticity of layer 303 together with layer 301. FIG. 5B provides a top view of a fragment of modulator 115 and shows a deformed surface of layer 301 when the voltage, +V, is applied across layer 301 and substrate 307. The shaded circles in FIG. 5B depict the inversions or "dimples" on the surface of layer 301 which is similar to that of a golf ball.

With its electrical characteristics described above, modulator 115 is used to modulate optical signal 121 in response to the data to be transmitted. Referring back to FIG. 3, the transmitted data is provided by data source 341 external to drive electronics 133. Included in electronics 133 is switch 343 which is electrically connected to layer 301 through contact 119a. Substrate 307 is connected to ground through contact 119b. In response to the values of the transmitted data from data source 341, switch 343 makes contact with a voltage source providing the predetermined voltage (+V) or with ground. By way of example, but not limitation, the transmitted data is in the form of binary bits each having a first or a second bit value. In response to the first bit value, switch 343 connects layer 301 to the same electric potential as substrate 307. Accordingly, acting like a plane mirror, layer 301 reflects optical signal 121 collimated by lens 111 into fiber core 109a, thereby achieving efficient signal coupling between fibers 107 and 109.

On the other hand, in response to the second bit value, switch 343 connects layer 301 to the voltage +V with respect to substrate 307. Accordingly, the surface of layer 301 transforms to a dimpled golf-ball like surface as described above, thereby creating an aberration in reflecting optical signal 121 collimated by lens 111. Although all the energy of signal 121 may be incident on the face of cladding layer 109b and fiber core 109a, a much reduced amount of light energy is coupled to fiber core 109a and transported thereby to the receiver. As a result, the coupled output light is modulated.

It should be pointed out that because of the particular structure of modulator 115 and its fabrication process described above, the relatively small invertible areas (indicated by dash circles in FIG. 4) of modulator 115 can be arranged close enough to one another to afford a relatively large effective operating area aggregately. In addition, modulator 115 can be easily scaled to provide the effective operating area in virtually any size. Advantageously, modulator 115 can be easily made oversized to facilitate its lateral alignment in the Fourier plane and, at the same time, enjoys a short response time attributable to the small size of the individual invertible areas.

The foregoing merely illustrates the principles of the invention. It will thus be appreciated that those skilled in the art will be able to devise numerous other arrangements which embody the principles of the invention and are thus within its spirit and scope.

Figure 6:
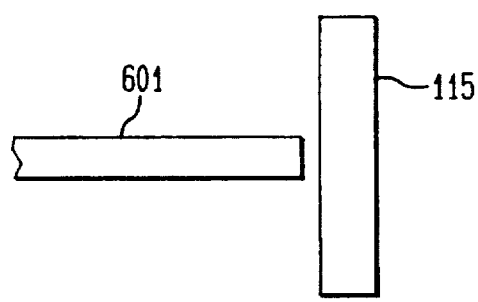
FIG. 6 illustrates an arrangement in which an optical fiber is butt-coupled to the modulator in accordance with the invention.

For example, in the illustrative embodiment modulator 115 is used in a dual-fiber arrangement. However, it may be butt-coupled to a single mode fiber, as shown in FIG. 6. In such an arrangement, an optical signal supplied by optical fiber 601 is efficiently coupled by modulator 115 into the same fiber in the first state, where the reflective surface of modulator 115 is flat and smooth. In the second state where the reflective surface of the modulator 115 is deformed, the inversions thereon prevents the optical signal from coupling into a propagating mode in fiber 601.

Finally, in the illustrative embodiment, substrate 307 is grounded, and layer 301 is switched by drive electronics 133 to be either at an electric potential +V with respect to substrate 307 or at the same electric potential as the substrate. However, it will be appreciated that a person skilled in the art will operate the drive electronics in a bipolar fashion where, for example, substrate 307 is connected to a voltage −V, and layer 301 is switched to be connected to either a voltage of +V or −V. As such, the bipolar operation affords a larger potential difference (i.e., 2 V versus V) between layer 301 and substrate 307 in the second modulation state, which may achieve a more pronounced surface inversion effect in modulator 115.

We claim:

1. Apparatus for modulating an optical signal in response to data, the modulated signal being transported through a light transmissive medium, comprising:

a reflective layer for reflecting the optical signal onto said light transmissive medium in a first state corresponding to a first value of said data so that a substantial portion of energy of the optical signal is transported through said light transmissive medium, the reflective layer including thereon a plurality of transformable areas which are separated from one another, the transformable areas each being in a first shape in the first state, the transformable areas each being controllably transformed into a second shape to deflect the optical signal off said light transmissive medium in a second state corresponding to a second value of said data so that a reduced portion of said energy is transported through said light transmissive medium.

2. The apparatus of claim 1 wherein the light transmissive medium comprises an optical fiber.

3. The apparatus of claim 1 wherein the reflective layer comprises a metallic layer.

4. The apparatus of claim 3 wherein the metallic layer comprises gold.

5. The apparatus of claim 1 wherein said data comprises binary bits.

6. The apparatus of claim 1 wherein the first data value is a first binary bit value and the second data value is a second binary bit value.

7. The apparatus of claim 1 wherein the optical signal to be modulated is received from said light transmissive medium.

8. Apparatus for transmitting data comprising:

a first light transmissive medium for providing an optical signal;

a second light transmissive medium;

a modulator having at least a reflective layers the reflective layer including thereon a Plurality of transformable areas which are separated from one another; and a controller responsive to values of the data to be transmitted for controlling a shape of each of the plurality of transformable areas, each of the plurality of transformable areas being in a first shape to reflect the optical signal onto said second light transmissive medium in a first state so that a substantial portion of energy of the optical signal is transported through said second light transmissive medium, the controller causing each of the plurality of transformable areas to transform into a second shape to deflect the optical signal off said second light transmissive medium in a second state so that a reduced portion of said energy is transported through said second light transmissive medium.

9. The apparatus of claim 8 wherein the first light transmissive medium comprises an optical fiber.

10. The apparatus of claim 8 wherein the second light transmissive medium comprises an optical fiber.

11. The apparatus of claim 8 wherein the reflective layer comprises a metallic layer.

12. The apparatus of claim 11 wherein the metallic layer comprises gold.

13. The apparatus of claim 8 wherein said data comprises binary bits.

14. The apparatus of claim 13 wherein the first state corresponds to a first binary bit value and the second state corresponds to a second binary bit value.

15. The apparatus of claim 8 wherein the first light transmissive medium is the same as the second light transmissive medium.

16. The apparatus of claim 8 wherein the transformable areas cause an aberration in reflecting the optical signal in the second state.

17. The apparatus of claim 16 wherein each of the transformable areas is indented to cause the aberration.

18. Apparatus for modulating an optical signal in response to data, the modulated signal being transported through a light transmissive medium, comprising:

a first layer;

a semiconductor layer of a conductivity type; and a non-conducting layer disposed between said first layer and said semiconductor layer for forming a plurality of gaps therebetween, thereby forming a plurality of transformable areas on said first layer, said first layer reflecting the optical signal into the light transmissive medium in a first state corresponding to a first value of said data, and being attracted into the plurality of gaps to change a shape of each of the plurality of transformable areas in a second state corresponding to a second value of said data so that a substantial portion of the optical signal is deflected by said first layer off the light transmissive medium.

19. The apparatus of claim 18 wherein said first layer comprises silicone nitride and a metallic surface.

20. The apparatus of claim 18 wherein said metallic surface comprises gold.

21. The apparatus of claim 18 wherein said non-conducting layer comprises phosphosilicate glass.

22. The apparatus of claim 18 wherein said data comprises binary bits.

23. The apparatus of claim 22 wherein the first data value is a first binary bit value and the second data value is a second binary bit value.

24. A method for use in a modulator for modulating an optical signal in response to data, said modulator comprising a reflective layer the reflective layer including thereon a plurality of transformable areas which are separated from one another, the modulated signal being transported through a light transmissive medium, comprising the steps of:

reflecting, from the reflective layer, said optical signal onto said light transmissive medium in a first state corresponding to a first value of said data so that a substantial portion of energy of the optical signal is transported through said light transmissive medium, the plurality of transformable areas each being in a first shape; and causing each transformable area on said reflective layer to be transformed into a second shade to deflect the optical signal off said light transmissive medium in a second state corresponding to a second value of said data so that a reduced portion of said energy is transported through said light transmissive medium.

25. The method of claim 24 wherein said data comprises binary bits.

26. The method of claim 25 wherein the first data value is a first binary bit value and the second data value is a second binary bit value.

27. The method of claim 24 further comprising the step of receiving the optical signal to be modulated from said light transmissive medium.

28. A method for transmitting data using a first light transmissive medium and a second light transmissive medium, and a modulator having at least a reflective layer, the reflective layer including thereon a plurality of transformable areas which are separated from one another, comprising the steps of:

providing an optical signal through said first light transmissive medium; and controlling, in response to the values of said data, a shape of each of the plurality of transformable areas, each of the plurality of transformable areas being in a first shape to reflect the optical signal onto said second light transmissive medium in a first state so that a substantial portion of energy of the optical signal is transported through said second light transmissive medium, the controlling step including causing each of the plurality of transformable areas to be transformed into a second shape to deflect the optical signal off said second light transmissive medium in a second state so that a reduced portion of said energy is transported through said second light transmissive medium.

29. The method of claim 28 wherein said data comprises binary bits.

30. The method of claim 29 wherein the first state corresponds to a first binary bit value and the second state corresponds to a second binary bit value.

31. The method of claim 28 wherein the first light transmissive medium is the same as the second light transmissive medium.

32. The method of claim 28 wherein the transformable areas cause an aberration in reflecting the optical signal in the second state.

33. The method of claim 32 wherein each of the transformable areas is indented to cause the aberration.

* * * * *